US006944212B2

(12) United States Patent
Blum

(10) Patent No.: US 6,944,212 B2
(45) Date of Patent: Sep. 13, 2005

(54) METHOD AND APPARATUS FOR THE SPECTRALLY EFFICIENT ENCODING AND DECODING OF DISCRETE DATA INTO AND FROM ANALOG WAVEFORMS

(76) Inventor: Dieter W. Blum, 5115-244th Street, Langley, B.C. (CA), V2Z 1G5

( * ) Notice: Subject to any disclaimer, the term of this patent is extended or adjusted under 35 U.S.C. 154(b) by 839 days.

(21) Appl. No.: 09/728,633

(22) Filed: Dec. 1, 2000

(65) Prior Publication Data

US 2002/0044596 A1 Apr. 18, 2002

Related U.S. Application Data

(60) Provisional application No. 60/168,781, filed on Dec. 2, 1999.

(51) Int. Cl.$^7$ ............................................. H04L 25/00
(52) U.S. Cl. ...................... 375/216; 375/295; 375/316
(58) Field of Search ................................. 375/216, 240, 375/224, 265, 247, 275, 316; 341/143

(56) References Cited

U.S. PATENT DOCUMENTS

| | | | | |
|---|---|---|---|---|
| 4,860,312 A | * | 8/1989 | van den Heuvel et al. | . 375/243 |
| 5,712,866 A | * | 1/1998 | Stein et al. | ................. 375/130 |
| 5,818,813 A | | 10/1998 | Saito et al. | |
| 6,064,699 A | * | 5/2000 | Law | ........................... 375/244 |

* cited by examiner

*Primary Examiner*—Dac V. Ha
(74) *Attorney, Agent, or Firm*—Robert B. Hughes; Hughes Law Firm, PLLC

(57) ABSTRACT

A base band modulation system. There is a microcontroller which receives and manipulates a digital data stream to provide for addition of miscellaneous flag data. There is a continuously variable slope delta demodulator (CVSD) to receive the manipulated data stream and convert this to an analog signal. There is also a second microprocessor to receive the same.

3 Claims, 1 Drawing Sheet

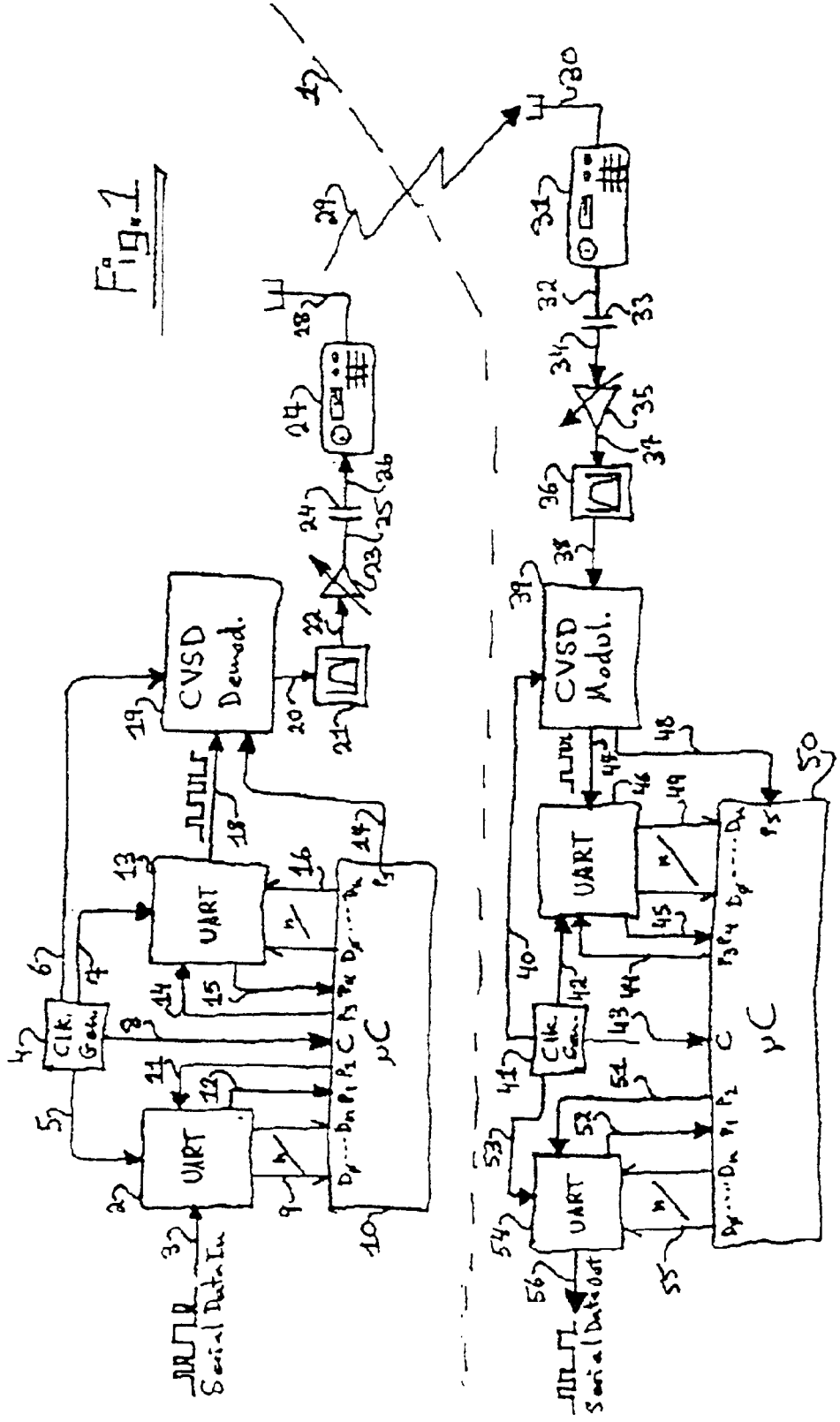

METHOD AND APPARATUS FOR THE SPECTRALLY EFFICIENT ENCODING AND DECODING OF DISCRETE DATA INTO AND FROM ANALOG WAVEFORMS

This application is based on and claims priority of U.S. Provisional Ser. No. 60/168,781, filed Dec. 2, 1999.

SUMMARY OF THE INVENTION

The present invention relates generally to baseband modulation and demodulation methods and techniques, and more particularly, it relates to baseband modulation and demodulation methods, techniques and apparatus therefor, that provide for the spectrally efficient encoding (modulated waveform generation or synthesis) of intelligence or information into the form of a time-variant non-stationary baseband analog signal, for the purpose of digital data transmission between two physically separate points via a communications channel or path provided via analog transmission media, and the subsequent decoding and recovery of said intelligence or information from said time-variant non-stationary baseband analog signal by a complementary decoding process (demodulation.)

The present invention serves as a codec (coder & decoder) or modem (modulator & demodulator) in order to: a.] have said encoder/modulator produce or generate non-stationary analog waveforms at its output in response to discrete data presented to its input, wherein said analog waveforms are in fact amplitude modulated (in the time-domain) encoded representations of said discrete data, and b.] have said decoder/demodulator receive said non-stationary analog waveforms produced by such an encoder/modulator as a.) above, and produce or generate discrete data at its output in response to said analog waveforms presented to its input. In a typical practical application, said analog waveforms may be transmitted between two points via an analog transmission path or medium, which may be metallic or ohmic in form (i.e., a physical electrical connection between two points), or of an electromagnetic wave propagation form (i.e., impressed onto an RF carrier or optical carrier)

The present invention utilizes a novel adaptive inverse continuously variable delta slope (ICVSD) modulation and demodulation technique and system that can be practically utilized as a high speed discrete (i.e., digital) data communications system over analog electrodynamic media of varying bandwidth and signal-to-noise ratios (i.e., information bearing capacity.)

The novel and key component in these applications is the ability of the present system to function at high data speeds and rates closely approaching the theoretical information capacity of a communications channel over AC coupled media with varying degrees of phase shift and DC offset effects. Unlike other modulation/demodulation methods (i.e., FSK, PSK, CAM, GMSK, etc.), in a typical practical application such as for an RF modem, the present Invention is able to utilize a substantially greater portion of the information capacity of such a communications channel or path then any of the prior art.

BACKGROUND OF THE INVENTION

The present invention utilizes a novel adaptive inverse continuously variable delta slope (ICVSD) modulation and demodulation technique to provide for a method and apparatus for high-speed data communications. This technique provides a far greater degree of performance and lower production costs, when compared to prior art modem methods and apparatus (i.e., based on dedicated hardware or advanced DSP-based.)

With a view towards a practical application such as enabling mobile or remote data communications via an RF communications path, a brief overview of the adaptive inverse continuously variable delta slope (ICVSD) modulation and demodulation technique and its relevant background will now be given. A typical RF communications path is established electromagnetically between two physically separate points via the action of an RF transmitter and an RF receiver. Typically a fixed radio frequency is utilized between said two points, although spread spectrum RF methods are currently finding more and more favor (although even in spread spectrum, one dwells on a fixed frequency for at least a minimum time duration necessary to convey the minimum information quantity necessary or desired).

At the present time, said RF frequency (i.e., carrier) is typically frequency modulated (FM). This is the general choice in analog systems, the majority of these being trunked systems in use for voice communications within mobile systems. One advantage of FM is it's high signal to noise ratio within a given bandwidth. Amplitude modulation of the RF carrier is also found to be used, especially at lower radio frequencies, and new techniques for phase modulation, or more recently, direct digital generation and modulation of an RF carrier, are also used. By far the most dominant though, is said analog FM modulation for providing voice communications.

In an effort to convey discrete data over such an FM-based analog voice bandwidth communication channel or path, various baseband signaling and modulation schemes have been utilized. These schemes range from FSK through PSK, QPSK, QAM, GMSK etc., with attendant higher data rates and increasing modem complexity. Practical implementations of the above schemes have not been able to provide data rates anywhere near the theoretical information capacity of a communications channel, because aside from the theoretical information capacity limit determinants (i.e., channel bandwidth and signal to noise ratio), a practical RF communications path represents a baseband analog channel that suffers from varying amounts of phase shift and DC offsets. This is because the RF transmitters modulator and RF receivers discriminator (demodulator) usually have their baseband signals AC coupled.

As such, only schemes that are relatively tolerant of DC level offsets etc. may be employed, and these are all of low spectral efficiency (i.e., ratio of discrete data to occupied baseband spectrum.) Accordingly, in an effort to utilize the more complex schemes (which were originally developed for PSTN data communications), those affording higher data rates and increased spectral efficiency (as well as increasing sensitivity to said effects and of ever increasing complexity), some RF transmitters and RF receivers have been modified or designed to provide DC coupling to and from said modulator and demodulator respectively. With A well designed transmitter and receiver, this should allow greatly increased data rate throughput for a given analog baseband bandwidth and signal to noise ratio, and it does. Excepting the fact that various drift effects between said transmitter and receiver inevitably lead to DC level shifts and offsets. This once again has imposed an upper bound or limit on practically achievable data rates with said prior art.

In the novel method according to one embodiment of the present invention, the technique employed presumes the de facto occurrence and existence of DC level shifts and offsets, as welt as phase shifts. The apparatus according to the present invention, continually adapts itself to these normally slowly changing shifts and offsets.

Although generically speaking, the method and apparatus according to the present invention falls under the heading of modulation and demodulation known as the continuously variable slope delta type, which is well known in the art, its use in an inverse form specifically for the conveyance of discrete data over an analog baseband channel, as in the present invention, appears to be unknown and unanticipated in and by the prior art.

Continuously Variable Slope Delta (CVSD) modulation (and demodulation) is normally associated with digital speech encoding and decoding, wherein it Is applied specifically for the digital communication of analog signals. As such, CVSD has been extensively used for the conversion of analog signals into a serial bit stream (discrete data) for subsequent digital transmission.

The key component in a CVSD system is the delta modulator which is well understood in the art. A delta modulator consists at a comparator in the forward path and an integrator in the feedback path of a simple control loop, The comparator has as its inputs a bandlimited analog input signal an the output or the integrator, The comparator output reflects the sign of the difference between the analog input signal magnitude and the integrator output amplitude at any instance in time. This sign bit is the actual digital output and also control the direction of ramp of the integrator. The comparator may be suitably clocked, its output thereby producing a synchronous and bandlimited digital bit stream.

If in such a CVSD system, the clocked serial bit stream from the above modulator is transmitted, received and applied to a similar integrator at the remote receive point, the receive integrator output is a copy of the transmitting control loop integrator output. In this manner, one may say that the transmitting integrator is tracking the original analog input signal and as a consequence, that the receive integrator is reproducing the said input signal being tracked. Appropriate low pass filtering of the receive Integrator output will remove most of the quantization noise, if the clock rate of the bit stream is an octave or more above the bandwidth of the input signal (i.e., the Nyquist rate.) In the case of voice communications having a bandwidth of 4 kHz, clock rates of 8 kHz and up would be used.

It can thus be seen that the delta modulator digitizes and conveys the analog input signal to a remote delta demodulator. The simplicity of the approach and the serial unframed nature of the encoded data stream has been ideal for application in data communications networks. Further, with a loss of input signal to the transmitting delta modulator, a continuous one-zero alternation is generated and transmitted. If the two integrators are made leaky, then during any loss of contact (i.e., disruption of the digital bit stream) the receiving delta demodulator output decays towards zero and receive restart can occur without any framing considerations when the receiving delta demodulator reacquires its digital input. Also, it should be noted that a delta demodulator is quite tolerant of sporadic bit errors.

The basic delta modulator/demodulator function described so far does not include the continuously variable slope aspect that is key to the improved performance of CVSD. Accordingly, with the basic delta modulator there are limitations with regard to the ability to accurately convert the input within a limited digital bit rate. The analog input signal must be bandlimited and amplitude limited. The frequency limitations are governed by the Nyquist rate, while the amplitude capabilities are governed by the gain of the integrator.

The frequency limits are bounded on the upper end, that is, for any input bandwidth there exists a clock frequency larger than that bandwidth required to transmit the signal with a specific noise level. However, the amplitude limits are bounded on both the upper and lower ends. Hence, for a given signal level, one specific gain will achieve an optimum noise level. Unfortunately, the basic delta modulator has a small dynamic range over which the noise level is optimally constant The addition of the continuouely variable slope (CVS) function to the basic delta modulator provides increased dynamic range by continuously adjusting the gain of the integrator. For a given clock frequency and input bandwidth, the CVS function therefore serves to increase the dynamic range of the delta modulator. This is done by adding an algoithm to the basic delta modulator which monitors the past few outputs of the delta modulator in a simple shift register.

This shift register is most often 3 to 4 bits in length and the accepted CVSD algorithm simply monitors the contents of the shift register and indicates if it contains all one's or zero's. This condition is called coincidence, and when it occurs, it indicates that the gain of the integrator is too small. Such a coincidence outputs is used to charge a low pass filter (called a syllabic filter in voice coding applications), whose voltage output is used to control the integrator gain through a pulse width modulator whose other input is the sign bit (i.e., up/down control). This form of algorithm provides a measure of the average power or level of the analog input signal.

This algorithm is repeated in the receiver and level data is thereby recovered. Because the algorithm only operates on the past serial data, it effectively changes the nature of the bit stream without changing the channel bit rate. The overall effect of the CVS algorithm is to compand the analog input signal.

Due to the simplicity, robustness and spectral efficiency of CVSD when applied towards digital voice communications, it was theoretically, mathematically and experimentally determined that one might utilize a novel and very special form or arrangement of such said CVSD modulator and demodulator, to obtain a function not yet known in the art.

In the present invention, at the transmit end, a CVSD demodulator is utilized in an inverse or "mirror" fashion (when compared to its prior art use for the analog decoding of a digital bit stream originating from a CVSD modulator), in order to provide for a modulation scheme that generates a bandlimited analog output signal in response to a synchronous and bandlimited digital bit stream (i.e., serial bit stream) presented at its digital input. Said bandlimited analog output signal (baseband) can then be transmitted (via media suitable for analog voice communication, e.g., radio) to a remote receive print.

At said remote receive point, a CVSD modulator is also utilized in an inverse or "mirror" fashion (compared to its prior art use for the digital encoding of analog signals originating from a source of analog intelligence), in order to provide for a modulation scheme that generates a synchronous and bandlimited digital output bit stream (i.e. serial bit stream) in response to a bandlimited analog input signal presented to its analog input.

The above novel approach to the analog transmission of digital data is especially attractive for use in AC coupled RF communication paths, wherein DC level shifts and offsets, as well as phase shifts have a large occurrence likelihood. Aside from the application towards fixed or mobile RF data communications, the present invention also has application and promise for use in more physical communication paths or channels, such as the public switched telephone network, fiber optics, etc.

BRIEF DESCRIPTION OF THE DRAWINGS

FIG. 1 shows schematically, a preferred embodiment of the method and apparatus according to the present invention, wherein the simplex transmission of encoded digital data is performed via RF means.

DETAILED DESCRIPTION OF THE DRAWING

With reference now to FIG. 1, there is shown a preferred embodiment of the method and apparatus according to the present invention, wherein there is shown the means for the simplex transmission of encoded digital data via RF means. As shown in FIG. 1, the transmit and receive portions of the system are depicted as being physically separate (but electromagnetically connected) by the dividing dashed line 1. For greater clarity, miscellaneous system components such as power supplies, voltage regulators or decoupling capacitors etc., are not shown, in that they are common electronic design art and are not relevant to the novelty means and functionality means of the preferred embodiment.

Described first, is the transmit (i.e., modulation) portion, in which as shown, a universal asynchronous receiver/transmitter (UART) 2 is provided to receive discrete digital data (in the form of a serial bit stream) at its input 3. Said UART 2 is clocked by an suitable clock signal 5, from master clock generator 4. Said UART 2 can be seen to thereby accept and convert a synchronous serial bit stream into a parallel data stream output at parallel data connection 9.

Said parallel data connection 9, may be of an appropriate width (i.e., number or bits/lines) as is dictated by system design requirements and the choice of microprocessor/microcontroller (uP/uC) shown as uC 10. It can be seen that said UART 2, by virtue of parallel data connection 9, can convey parallel digital data to appropriate digital data inputs on said uC 10 also provides a digital acknowledgement signal (i.e., data read) to said UART 2 via line 11, and said UART 2 provides a digital data ready strobe to said uC 10 via line 12. Master clock generator 4 further supplies a clock signal 8 to uC 10.

As shown, there is also a second UART 13, associated with this, said transmit portion of the preferred embodiment. Said UART 13 is further supplied by a suitable clock signal 7, from said master clock generator 4. Said UART 13 can accept a parallel data stream input via parallel data connection 16, shown here as originating from digital data outputs on said uC 10. The width of said parallel data connection 16 is again determined by system design requirements and the choice of uC 10. Said UART 13 can be seen to thereby accept and convert a parallel data stream input from uC 10 via parallel data connection 16 into a synchronous serial bit stream output via serial data output 18. It can be seen that said UART 13, by virtue of parallel data connection 16, can convey parallel digital data from appropriate digital data outputs on said uC 10. uC 10 also provides a digital data ready signal to said UART 13 via line 14, and said UART 13 provides a digital data read signal to said uC 10 via line 15. It should be pointed out that said UART's 2 and 13 could be part of a dual UART block (DUART), or alternatively could be internal to uC 10.

As described up to this point, the overall functionality of UART 2, uC 10, UART 13 and master clock generator 4, is to provide acceptance of a first serial digital bit stream (at a first desired rate), convert said serial data into parallel form for transfer to and acceptance by uC 10, in order that uC 10 may provide temporary storage or buffering thereof, as well as perform various direct data manipulations thereon (dependant on the memory and computational/instruction capabilities of uC 10). Thereafter, uC 10 may output said time delayed and manipulated data in parallel form to said UART 13 in order to be converted into and output as a second serial digital bit stream (at a second desired rate.)

Accordingly, one skilled in the art can see here a functional assemblage capable of inputting and outputting two serial data streams, respectively having perhaps not only different bit rates, but more importantly, whose data structures (i.e., protocol for bit assembly, start/stop demarcation bits, miscellaneous flag bits, CRC etc.) are different, and have in fact been altered, rearranged, arranged, manipulated, sorted, structured, filtered, parsed, padded packed or sequenced etc., between their Input and their output by the processing actions carried out internal to uC 10. For example, uC 10 may be programmed in firmware to provide for forward error correction etc.

In this preferred embodiment however, the primary purpose of the above described functional assemblage is to perform as a front-end to tho analog baseband transmit modulator 19, which is shown here as a CVSD demodulator. Said transmit modulator 19, is provided with a clock signal from master clock generator 4, a synchronous bandlimited serial bit stream 18 and an inhibit control signal 17.

As briefly described in the background of the invention, and as is shown in more detail in FIG. 1, although said transmit modulator 19 is actually comprised of a CVSD demodulator, it serves to produce or generate an analog baseband signal (i.e., an information bearing amplitude modulated non-stationary time-variant waveform) that when appropriately filtered, is bandlimited and can be transmitted over suitable analog transmission means.

Said transmit modulator 19 is seen to output its generated analog signal 20 into the input of bandpass filter 21, whose output 22 is fed into variable gain unit 23. The output 25 of said gain unit 23 is fed through DC blocking capacitor 24 (i.e., AC coupling) to the analog input 26 of a radio transmitter 27.

The analog signal thereby presented to said analog input 26 of said radio transmitter 27 will ten serve to modulate the RF carrier of a desired frequency in order to produce an intelligence modulated radio frequency wave 29 that can electromagnetically propagate through free space after emission from its antenna 28.

In the above manner, the method and apparatus according to the preferred embodiment of the present invention encodes an input digital data bit stream 3, into a spectrally efficient information bearing baseband analog waveform 25 capable of passing (i.e., transmittal) for example, over a standard, practical bandlimited analog communications channel, such as an RF linked path 29 (i.e., electromagnetic wave propagation or radiation), as is shown in the preferred embodiment depicted in FIG. 1.

With specific reference again to FIG. 1, a portion of said intelligence modulated radio frequency wave 29 that has electromagnetically propagated through free space after emission from the antenna 28 at the transmitter position, is intercepted at the receive position by antenna 30. The received analog RF signal from antenna 30 is then presented to the RF input of radio receiver 31, which serves to demodulate the RF carrier of a (the) desired frequency in order to produce and output an intelligence bearing baseband analog signal 32 which is fed through DC blocking capacitor 33 to the input 34 of adjustable or variable gain unit 35. Said output 37 of variable gain unit 35, is then presented to the input of bandpass filter 36 (i.e., anti-aliasing filter) and the output 38 of said filter 36, is then fed into the analog input of receive demodulator 39.

As also previously described in the background of the invention, and as is shown in more detail in FIG. 1, although said receive demodulator 39 is actually comprised of a CVSD modulator, it does serve to produce or generate a synchronous and bandlimited digital serial bit stream 47 in response to said input of said received analog baseband signal 38 (i.e., the information bearing amplitude modulated non-stationary time-variant waveform.)

Said receive demodulator 39 outputs said serial bit stream 47 to UART 46. Demodulator 39 also receives a clock signal 40 from master clock generator 41, and also produces a signal valid detect output 48, which is fed to a digital input on uC 50. UART 46 receives a clock signal 42 from master clock generator 41 and also converts said serial bit stream input 47 to a parallel data stream 49, which is input to digital inputs on uC 50. Once again, the width of said parallel data stream is determined by system design and the choice of uC 50. UART 46 also receives a digital data read acknowledge signal 44 from a digital output on uC 50 and said UART 46 provides a digital data ready strobe to said uC 50 via line 45. uC 50 also receives a doc signal 43 from master clock generator 41.

It can also be seen that uC 50 provides a parallel data stream 55 from digital outputs to a second UART 54, along with a digital data ready strobe 51. Said UART 64 receive a clock signal 53 from master clock generator 41 and also outputs a data read acknowledge signal 52 to a digital input on uC 50. UART 54 can therefore be seen to convert a parallel data stream 55 from uC 50 to an output serial bit stream 56. The digital section of the receive portion of the present invention can therefore be viewed as the inverse functional assemblage previously described as part of the transmit portion, with all the same capabilities in terms of digital data rate and structure manipulation (due to the action of uC 50.)

In the above described manner, the method and apparatus according to the preferred embodiment of the present invention decodes a spectrally efficient information bearing baseband analog waveform 32 (generated by a companion transmit encoder/modulator) which has been passed (i.e., transmitted) for example, over a standard, practical bandlimited analog communications channel, such as the illustrated RF linked path 29 (i.e., electromagnetic wave propagation or radiation), into an output digital data bit stream 56, as is illustrated in the preferred embodiment depicted in FIG. 1. This technique, method, apparatus and function comprises said inverse continuously variable delta slope modulation (ICVSD) as described in the context of the preferred embodiment of the present invention.

What is claimed is:

1. A system to transmit and receive information by encoding and decoding discreet data into and from analog waveforms, said system comprising:
   a) a first microcontroller adapted to receive a digital data stream, said microcontroller being arranged to manipulate said digital data stream to frame said digital data stream to provide data bit assembly in accordance with a desired protocol, to provide for addition of miscellaneous flag data, and to provide for the addition of error correction data, and also arranged to output said manipulated data as a manipulated digital data stream;
   b) a continuously variable slope delta demodulator (CVSD) to receive said manipulated digital data stream and to convert said manipulated digital stream to an analog signal;
   c) a continuously variable slope delta (CVSD) modulator arranged to receive the analog output signal from said CVSD demodulator, and to output a digital data stream;
   d) a second microprocessor arranged to receive said digital data stream from said CVSD modulator and to unframe said digital data stream, perform error checking and corrections, perform data bit deinterleaving according to said desired protocol, and output a recovered digital data stream corresponding to said initial digital data stream.

2. The apparatus as recited in claim 1, wherein:
   a) there is a universal asynchronous receiver/transmitter to receive the digital data stream and convert the digital data stream to a parallel data stream output which is transmitted to said first microcontroller;
   b) a second universal asynchronous receiver/transmitter to receive a parallel output from said first microcontroller and transmit said manipulated digital data stream to said continuously variable slope delta demodulator;
   c) a band pass filter to receive the analog signal from the said continuously variable slope delta demodulator;
   d) a variable gain unit to receive an output from the band pass filter;
   e) a blocking capacitor to receive an output from the variable gain unit and transmit an output to a transmitter to transmit the analog signal output from the first universal asynchronous receiver/transmitter.

3. A method of transmitting and receiving information by encoding and decoding discreet data into and from analog waveforms, said method comprising:
   a) receiving a digital data stream, and then manipulating said digital data stream to frame said digital data stream to provide data bit assembly in accordance with a desired protocol, provide for addition of miscellaneous flag data, and provide for the addition of error correction data, and also arranged to output said manipulated data as a manipulated digital data stream;
   b) utilizing a continuously variable slope delta demodulator (CVSD) to receive said manipulated digital data stream and to convert said manipulated digital stream to an analog output signal;
   c) utilizing a continuously variable slope delta (CVSD) modulator to receive the analog output signal from said CVSD demodulator, and to output a digital data stream;
   d) receiving said digital data stream from said CVSD modulator and unframing said digital data stream, performing error checking and corrections, performing data bit deinterleaving according to said desired protocol, and providing an output of a recovered digital data stream corresponding to said digital data stream.

* * * * *